US006843817B2

United States Patent
Noda et al.

(10) Patent No.: US 6,843,817 B2
(45) Date of Patent: Jan. 18, 2005

(54) CERAMIC FILTER AND FILTER DEVICE

(75) Inventors: Naomi Noda, Ichinomiya (JP); Kanji Yamada, Chita-gun (JP)

(73) Assignee: NGK Insulators, Ltd. (JP)

( * ) Notice: Subject to any disclaimer, the term of this patent is extended or adjusted under 35 U.S.C. 154(b) by 62 days.

(21) Appl. No.: 09/959,836

(22) PCT Filed: Mar. 8, 2001

(86) PCT No.: PCT/JP01/01804

§ 371 (c)(1),
(2), (4) Date: Nov. 8, 2001

(87) PCT Pub. No.: WO01/68219

PCT Pub. Date: Sep. 20, 2001

(65) Prior Publication Data

US 2002/0157358 A1 Oct. 31, 2002

(30) Foreign Application Priority Data

| Mar. 13, 2000 | (JP) | 2000-068862 |
| Jun. 1, 2000 | (JP) | 2000-164116 |

(51) Int. Cl.[7] .......................... B01D 39/20; B01D 46/00
(52) U.S. Cl. .......................... 55/282.3; 55/482; 55/487; 55/523; 55/524; 55/DIG. 10; 55/DIG. 30; 60/299; 60/311; 423/213.2; 423/213.5; 423/215.5; 422/177
(58) Field of Search .......................... 55/282.2, 282.3, 55/482, 482.1, 487, 523, 524, DIG. 10, DIG. 30; 423/213.2, 213.5, 213.7, 215.5; 422/177, 180, 181; 60/299, 300, 303, 311

(56) References Cited

U.S. PATENT DOCUMENTS

| 4,231,763 | A | * | 11/1980 | Baisden | 60/311 |
| 4,451,441 | A | * | 5/1984 | Ernest et al. | 423/213.2 |
| 4,503,672 | A | * | 3/1985 | Stark et al. | 60/311 |
| 4,509,327 | A | * | 4/1985 | Enga | 60/311 |
| 4,934,142 | A | | 6/1990 | Hayashi et al. | 60/297 |
| 5,009,857 | A | * | 4/1991 | Haerle | 55/523 |
| 5,558,760 | A | * | 9/1996 | Sekhar | 55/523 |
| 5,656,048 | A | * | 8/1997 | Smith et al. | 55/523 |
| 5,750,026 | A | * | 5/1998 | Gadkaree et al. | 55/523 |
| 6,361,579 | B1 | * | 3/2002 | Itoh et al. | 55/523 |
| 2002/0178707 | A1 | * | 12/2002 | Vance et al. | 55/523 |

FOREIGN PATENT DOCUMENTS

| DE | 44 14 625 A1 | 10/1994 | |
| EP | 1 064 984 A2 | * 1/2001 | B01D/53/94 |
| JP | 58-174216 | 10/1983 | |
| JP | 63-162014 | 7/1988 | |
| JP | 4-40235 | 2/1992 | |
| JP | 4-243524 | * 8/1992 | B01D/39/14 |
| JP | 7-8729 | 1/1995 | |
| JP | 07313882 | 12/1995 | |

* cited by examiner

Primary Examiner—Frank M. Lawrence
Assistant Examiner—Jason M. Greene
(74) Attorney, Agent, or Firm—Parkhurst & Wendel, L.L.P.

(57) ABSTRACT

The present invention provides a ceramic filter to be used at a high temperature, and it contains a substance having preferential reactivity with an ash component contained in materials captured by the ceramic filter and not removed by a high temperature treatment such as combustion over the principal component of the ceramic filter; the reaction between the ash component being not removed by a high temperature treatment such as combustion of the filter and remaining accumulated and the filter component to cause melting of the filter being suppressed to attain a long period of service.

31 Claims, 1 Drawing Sheet

CERAMIC FILTER AND FILTER DEVICE

TECHNICAL FIELD

The present invention relates to a ceramic filter being used at an elevated temperature, and being subjected to a high temperature treatment such as combustion for removing accumulated materials captured by the filter upon use, such as the one being represented by a diesel particulate filter (DPF).

BACKGROUND ART

A large quantity of fine particles (particulate) mainly comprising carbon are contained in the exhaust gas of a diesel engine. Since the environmental pollution is caused if particulate is discharged into the air, there exists the technique for removing the particulate prior to the discharge of the exhaust gas into the air by installing the particulate trap device including a filter for trapping the particulate in the exhaust system of the diesel engine.

The trapped particulate is gradually accumulated in the filter upon use of the particulate trap device. Therefore, the filter function is regenerated by backwash or combustion of the filter to remove the particulate when a certain quantities of the particulate has been deposited during the use of the particulate trap device, in order to prevent engine performance from decreasing by increased exhaust resistance due to increased quantity of the deposited particulate in the filter.

However, the overall system turns out to be complex and large size in the method for removing the particulate by backwash. When the particulate is removed by combustion, on the other hand, a part of the particulate is left behind as ash components after regeneration of the filter by combustion, and this residue is accumulated in the filter after many times of regenerative combustion. Consequently, there is such a problem that the filter is lost by being molten at a temperature lower than the melting point of the filter material due to the reaction of this residue with the material constituting the filter at an elevated temperature during operation of the device or in the regenerative combustion treatment.

Actually, the deposited particulate contains elements such as P, S, Ca, Na, Zn, Cr, Fe, Ni and Cu originating from fuels, engine oils and pipe and tube parts. melting as described above is caused because compounds and/or composites containing these elements are left behind after combustion of the particulate. The filters comprising oxide ceramic based materials involve severe problems since they are particularly reactive with the ash component.

Under these situations, JP-A-10-33923 discloses a technology as a method for removing deposited ash component in which the ash component is once deposited on a ceramic particle layer adhered on the surface of the filter, and they are blown off thereafter by backwash together with the ceramic particles. JP-A-11-210440 discloses a technology for selective discharge of the ash component by constituting the seal at the outlet side of DPF with a mesh member.

Other technologies for retaining a catalyst on the filter for facilitating combustion of the particulate have been investigated independently from the technologies described above. For example, JP-A-2-75314 discloses a method for immersing DPF in a mixed solvent of silica sol and catalyst solution.

JP-A-57-91726 discloses a technology in which an inorganic carrier is allowed to contain a molybdic acid salt or a mixed acid of molybdenum oxide and an metal oxide to obtain an exhaust gas filter of an internal combustion engine. JP-A-2-60374 discloses a technology in which a tungstic acid salt and a platinum group element are allowed to be dispersed and loaded on a porous inorganic substrate carried on a refractory structure of the three dimension having a gas filter function. JP-A-10-274030 discloses a technology in which a metallic component having a catalytic activity is retained on a porous filter of an auto-pyrolitic type refractory metal via a catalyst carrier comprising a heat-resistant inorganic oxide.

However, it is a problem for the technology disclosed in JP-A-10-33923 that the overall system becomes complex and large size as in the foregoing backwash component regeneration method due to forced peeling of the ceramic particles on which ash components have been adhered. The technology disclosed in JP-A-11-210440 involves such a problem that it is difficult to permit only the ash component to pass through the outlet side mesh member selectively from the particulate and the ash component having different particle size distribution with each other, thereby either trap efficiency of the particulate or discharge efficiency of the ash component is forced to be sacrificed.

Although Japanese JP-A-2-75314, 57-91726 and 10-274030, and JP-B-2-60374 have proposed technologies in which catalysts are designed for complete combustion of the deposited particulate at a lower temperature, no idea or investigation from the view point of suppression of melting of the filter due to the deposited ash component, as well as reactivity or interaction between the loaded catalyst and deposited ash component, has not been investigated at all.

After all, technologies that can completely solve the problem "The filter is finally lost by being molten at a temperature lower than the melting point of filter." have not been found yet. Such problem arises as a result of accumulation of a part of materials captured by the ceramic filter remained as ash component after regenerative combustion in the filter by many times of regenerative treatments by combustion or long term continuous regeneration, followed by a reaction of the ash component with the filter component at an elevated temperature during use or during the regenerative treatment by combustion in the system for regenerating filter functions. Such system uses a high temperature ceramic filter comprising a material represented by a oxide based ceramic such as cordierite, carbide such as SiC and/or a carbon nitride such as $Si_3N_4$, and regenerates the filter function by removing materials captured by the filter by, for example, continuous combustion or intermittent combustion after deposition of a certain amount of the materials captured by the filter.

The present invention has been made, in view of the above-mentioned situations, and, therefore, the object thereof is to provide a ceramic filter and a filter device capable of using for a long-term, by suppressing melting of the filter derived from the reaction between the ash component contained in the materials captured by the filter which are captured by the ceramic filter and remains accumulated by being not removed by a high temperature treatment such as combustion of the filter, and the filter component at a temperature lower than the melting point of the filter component.

DISCLOSURE OF INVENTION

The present invention provides a ceramic filter to be used at an elevated temperature, characterized in that said filter contains a substance having preferential reactivity with an ash component which is contained in materials captured by a ceramic filter and not removed by a high temperature treatment such as combustion over the principal component of the ceramic filter.

The present invention also provides a filter device (a first filter device), characterized by comprising (1) above-mentioned ceramic filter and (2) a catalyst placed at the upstream side of the ceramic filter.

The present invention further provides (1) a filter device, characterized by comprising a ceramic filter to be used at an elevated temperature, and (2) a pre-filter being provided upstream said filter and containing a substance having preferential reactivity with an ash component which is contained in materials captured by a ceramic filter and not removed by a high temperature treatment such as combustion over the principal component of the ceramic filter.

The "materials captured by a ceramic filter" as used in the present invention means a substance captured by a filter and remaining on the filter. The "reaction" as used in the present invention is not solely restricted to mean a chemical reaction, but includes a state in which an action of one component gives any affect on the other component, or both components interacts with each other.

BEST MODE FOR CARRYING OUT THE INVENTION

Figure 1A:
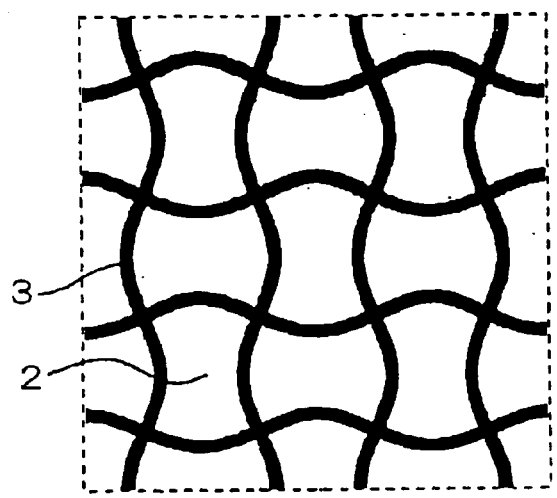
FIG. 1A is a partially enlarged cross-section showing one embodiment in which the filter has a honeycomb structure.

In the present invention, a substance is in advance allowed to be contained in the filter; said substance being easily reactive with an ash component that is contained in the materials captured by the filter, and not removed by a high temperature treatment such as combustion, and said substance having preferential reactivity over the principal component of the ceramic filter (such a substance is referred to as an anchor substance). When the filter has such a construction, the accumulated ash component preferentially reacts with the anchor substance even when the filter is exposed to a,high temperature during use or during regeneration, thereby the reaction of the ash component with the material constituting the filter is suppressed, and consequently, the main part of the filter from is protected from melting.

The first filter device according to the present invention is a one comprising a catalyst provided upstream a ceramic filter in which an anchor substance reactive easily with the ash components is contained. The catalyst upstream the filter is mainly provided for purifying harmful components in the exhaust gas. In the case of a ceramic filter having such a constitution, it is liable to be suffered from melting since it is exposed to the heat of catalytic reaction generated in the catalyst at the upstream side and the heat of the exhaust gas as well, however, the melting can be effectively prevented by using the ceramic filter containing the anchor substance.

In the case of the second filter device according to the present invention, a pre-filter containing the anchor substance easily reactive with the ash component is provided upstream the ceramic filter. By employing this structure, the particulate which shares a part of the total particulate and contains therein an ash source is selectively removed by the pre-filter provided upstream, and the risk of melting can be largely reduced in the downstream side ceramic filter on which the remaining particulate sharing a major part of the total particulate and containing no ash source is deposited when the ceramic filter is exposed to a high temperature during use or regeneration.

It is preferable to separately place the pre-filter containing the anchor substance upstream the ceramic filter. However, when separate attachment of the pre-filter is difficult from the point of restricted built-in space or pressure drop, a relatively favorable effect may be attained by allowing the anchor substance to be contained in the vicinity of the feed side of the ceramic filter by taking advantage of the heat of combustion during regeneration usually concentrated at near the outlet side of the ceramic filter. For obtaining a higher effectiveness, it may be possible to install a pre-filter containing an anchor substance that is the same one as and/or different one from the anchor substance in the ceramic filter in combination with the ceramic filter containing the anchor substance.

Alkali metals and alkali earth metals particularly degrade the filter material among the components accumulated as ash component (the term "filter" hereinafter means both the ceramic filter and the pre-filter hereinafter, when "ceramic filter" is merely used without any distinctions). Therefore, an anchor substance that preferentially reacts with these metals is preferably used when they may be accumulated. Since the filter comprising an oxide based ceramic material such as cordierite is liable to be suffered from melting reacting with P, S, Ca, Na, Zn, Cr, Fe, Ni and Cu, an anchor substance that preferentially reacts with these elements is preferably used when the ash component contain these elements. Examples of the anchor substance include B, Al, Si, P, S, Cl, Ti, V, Cr, Mn, Ga, Ge, As, Se, Br, Zr, Mo, Sn, Sb, I, W, Ce and La, although it depends on the material of the filter.

Among these elements, B, Al, Si, P, S, Ti, Cr, Mn, Br, Zr, Mo, Sn, I and W are preferable from the point of the toxicity and the popularity in the use, and Si, P, Ti, Cr, Mo and W are preferable from the point of reactivity with the alkali metals and alkali earth metals. Si, P, Ti and W are preferable from the point of heat resistance. Inexpensive Si and P are industrially more favorable anchor substances among them. These anchor substances may be added alone, or in combination of several kinds of them.

While the form of the anchor substance added is not particularly restricted, and any of the single substance may be used. However, a compound of other elements is usually used. For example, an oxide is used for adding as a solid (powder), and various solutions of nitrate, sulfate, hydroxylate, ammonium salt or salt of an organic acid may be appropriately used for adding as a liquid (solution). In particular, a form of the substance that does not leave any substances other than the anchor substance and oxygen behind in the filter after firing is favorably used. In an advantageous example, zeolite is used for adding Si as a solid (powder). A composite of two or more anchor substances may be also favorably used.

Since the alkali metal and alkali earth metal vigorously degrade the filter material, it is preferable to suppress the content of such metals as impurities derived from the anchor substance to as low as 0.1% or less, if possible. The site of the anchor substance in the filter is not particularly restricted, and it may present within or on the surface of the filter. The methods for distributing the anchor substance are as follows.

(The Method for Dispersing the Anchor Substance Within the Filter)

Since the filter is generally a porous material, it is advantageous to disperse the anchor substance in the pores thereof. In one example, the filter is immersed in a solution having a relatively low viscosity and containing at least one kind of the anchor substance, thereby the solution penetrates into the interior part of the filter material to dispose interior part of the filter. In a preferable method, the anchor substance is previously added to the filter material in the step for manufacturing the filter. The anchor substance may be added as a solution or a solid (powder) such as an oxide. This method is advantageous in that a minimum degree of pressure drop of a fluid is assured.

(Method for Distributing the Anchor Substance on the Surface of the Filter)

The anchor substance can be formed as a film on the surface of the filter. While an example of the method is listed below, it is not restricted to any of the methods below. However, the pressure drop tends to be increased in any of the methods as compared with the foregoing method for disposing the anchor substance within the filter.

(1) A solution containing the anchor substance and having a relatively low viscosity is prepared using a sol, and the filter is immersed in the solution to form a layer of the anchor substance on the surface of the filter.

(2) A layer containing a heat-resistant inorganic oxide and the anchor substance is formed on the surface of the filter. The heat-resistant inorganic oxide is used as a carrier for highly dispersing and retaining the anchor substance. A slurry of the heat-resistant inorganic oxide prepared by previously adding the anchor substance may be coated on the filter, or a filter previously coated with a slurry of the heat-resistant inorganic oxide may be immersed in a solution containing the anchor substance. Examples of the refractory inorganic salt include $Al_2O_3$ as well as $CeO_2$, $ZrO_2$ and $La_2O_3$ that are usually used as catalysts for purging the automobile exhaust or a complex oxide thereof, or a complex oxide of them with $Al_2O_3$.

Naturally, the anchor substance may be dispersed within the filter and it may be coated on the surface of the filter at the same time in order to attain a higher effect for suppressing melting. A drying and/or firing step is preferably provided after each step of immersion in the solution and coating the slurry for fixing the anchor substance.

When a catalyst layer is provided in the filter for facilitating a high temperature treatment (combustion) of the materials captured by the filter or for purging harmful substances contained in the exhaust gas, the catalyst layer may be used together with the anchor substance. Favorable methods thereof include providing the catalyst layer after disposing the anchor substance within the filter, disposing the anchor substance together in the catalyst layer, or laying a layer containing the anchor substance over the catalyst layer.

The shape of the filter according to the present invention is not particularly restricted, and the melting suppressing effect as hitherto described may be attained by using any shapes of monolith honeycomb, pipe, foam and fiber. However, a large effect may be obtained by using a honeycomb structure filter comprising a number of through-holes (cells) having thin partition walls, or a filter composed of ultra-fine fibers. The honeycomb structure filter of which cells are sealed alternately on an inlet side face and an outlet side face to form a checkered pattern on both sides has an excellent filtration efficiency, and the device employing this structure in the present invention is a quite preferable embodiment. The filter having the structure described above is favorably used for the diesel particulate filter (DPF).

Figure 1B:
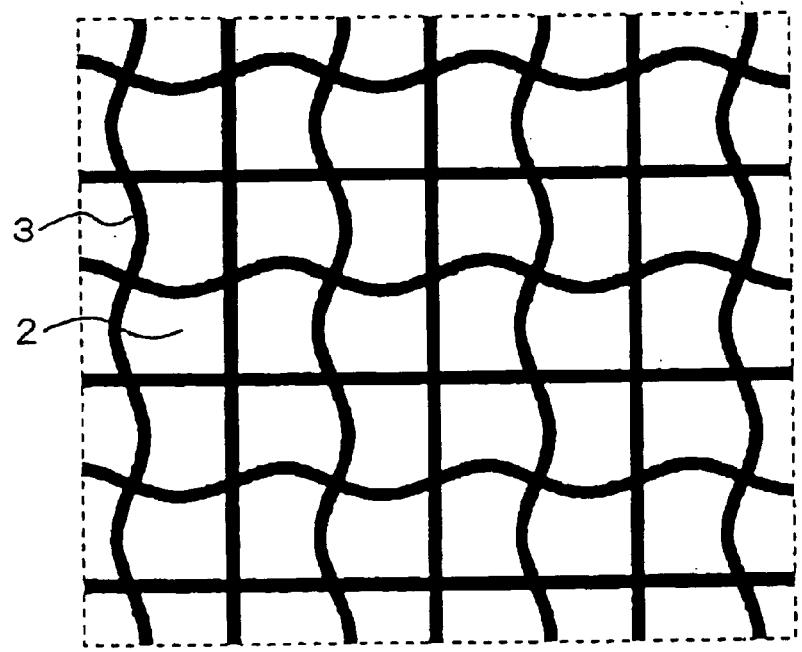
FIG. 1B is a partially enlarged cross-section showing another embodiment in which the filter has a honeycomb structure.

Any shapes of the through-holes (cells) such as circular, polygonal and corrugated shapes may be used for filter having the honeycomb structure. A corrugated wall in which the partition wall 3 dividing the cell 2 is deformed so that its cross section is corrugated as shown in FIGS. 1a and 1B is preferable for improving contact efficiency between the gas and partition wall, since a turbulence is generated besides increasing GSA (geometrical surface area corresponding to the filter area). The outer shape of the honeycomb structure filter may be cylindrical, or may be formed into a desirable shape fitted to the inner shape of the exhaust system installed.

Although the cell density of the honeycomb structure filter is not particularly restricted, a cell density within the range of 6 to 1500 cells/square inch (0.9 to 233 cells/cm$^2$) is preferable as a filter, and a range of 50 to 400 cells/square inch (7.8 to 62 cells/cm$^2$) is more preferable. Mechanical strength and effective GSA become insufficient as a honeycomb structure when the cell density is less than 6 cells/square inch (0.9 cells/cm$^2$), while pressure loss for allowing the gas to flow increases when the cell density exceeds 500 cells/square inch (233 cells/cm$^2$).

A sufficient effect may be attained in a simple honeycomb structure having no sealing, when a honeycomb structure having a cell density of as high as 600 cells/square inch (93 cells/cm$^2$) is particularly employed for the pre-filter. A higher effect may be expected by devising a turbulence generating and/or GSA improving structure such as the corrugated wall honeycomb structure as hitherto described.

The thickness of the partition walls of the honeycomb structure filter is preferably in the range of 50 to 2000 µm, more preferably in the range of 200 to 800 µm. Mechanical strength as the honeycomb structure becomes insufficient when the thickness of the partition wall is less than 50 µm, and effective GSA decreases while increasing the pressure drop for the gas flow when the thickness exceeds 2000 µm. Since the thin wall with a thickness of 50 to 200 µm readily suffers from melting by deformation of the partition wall or holes on the wall by melting, the necessity of the present invention is high with a large melting suppressing effect.

While oxide based materials such as cordierite, mullite, alumina and zirconium phosphate, carbide based materials such as SiC and nitride based materials such as $Si_3N_4$ may be favorably used for the filter material, the depletion preventive effect becomes the largest by using a filter comprising cordierite that is reactive to the alkali metals and alkali earth metals.

The preferable relation between the pre-filter and ceramic filter will be described hereinafter when the pre-filter is provided as in the second filter device according to the present invention. While the particulate containing ash sources is selectively removed by using the pre-filter, it is possible to further improve selectivity by taking advantage of the facts that the particulate containing the ash source usually has a larger particle diameter as compared with the particulate that contains no ash source.

For example, it is possible to allow the particulate having a larger particle diameter to separate by filtration with the pre-filter, and to allow the particulate having a smaller particle diameter to separate by filtration with the ceramic filter, by making the thickness of the partition wall of the pre-filter to be thinner than the thickness of the partition wall of the ceramic filter, by making the mean porosity of the pre-filter to be larger than the mean porosity of the ceramic filter, and by making the pore ratio of the pre-filter to be larger than the pore ratio of the ceramic filter, when both the pre-filter and ceramic filter have honeycomb structures.

While the quantity of the anchor substance dispersed in the filter depends on the material and pore ratio of the filter and the kind of the anchor substance, the content is preferably in the rage of 0.5 to 50% based on the weight of the main part of the filter, more preferably in the range of 1 to 3 times of the weight of the filter material. No melting preventing effect will be manifested at a content of the anchor substance of less than 0.5%, and the pressure drop will be of problem when the content exceeds 50%. Less than one time of the anchor substance to the weight of the filter has a small melting preventive effect, while the effect is saturated at more than three times of the anchor substance to the weight of the filter.

Although the filter according to the present invention may contain catalyst components represented by platinum group elements in addition to the anchor substance in order to promote high temperature treatment (combustion) and to purify harmful components in the exhaust gas, the disposition and addition methods for reducing the contact probability between them should be selected when the catalyst components is added in the filter, since the performance of either of them may be compromised by allowing the anchor substance to contact the catalyst components.

For example, when the anchor substance and catalyst components are disposed within the filter, it is preferable to sequentially immerse the filter in each solution followed by drying and/or firing step after each immersion step to independently fix the anchor substance and catalyst component. When the anchor substance and catalyst component are coated on the surface of the filter, on the other hand, it is preferable to coat them as different layers with each other, rather than to coat a mixture thereof. More preferably, the anchor substance is separated from the catalyst component by disposing the former within the filter while coating the latter on the surface of the filter, or inversely, the catalyst component is disposed in the filter and the anchor substance is coated on the surface of the filter.

Otherwise, the both substances are separately placed in the gas flow direction, or the anchor substance is placed in the vicinity of the inlet side while the catalyst component is placed in the vicinity of the outlet side. Inverse distribution of them also comprises one of the favorable embodiments. An arbitrary combination thereof is also acceptable. Similarly, separate distribution of the anchor substances is preferably considered from the view point of avoiding an interaction among the anchor substances, when a plurality of the anchor substances are present together in the filter.

The ceramic filter according to the present invention is usually used together with a heater and/or catalyst, in order to remove most of the materials captured by the filter deposited by a high temperature treatment (combustion). The heater may be integrated in the filter, or may be provided as a separate member at the upstream side of the filter. However, the effect of the present invention becomes higher in the former case since the risk of melting is higher in the former case.

The high temperature treatment of the materials captured by the filter may depends on the heat of the exhaust gas, on the combination of the heat of the exhaust gas and catalyst component, on the heat of the exhaust gas and heater, or on the combination of any of them. However, the present invention may be favorably applied in either case.

Although the pre-heater can be regenerated by the high temperature treatment, the risk of melting becomes higher since a lot of the particulate containing ash components and/or ash source may be deposited on the pre-filter. While the filter device may be constructed by separately placing the catalyst at the upstream side of the pre-filter, the risk of melting is also enhanced since the pre-filter is exposed to the heat of the exhaust gas as well as the heat of the reaction of the catalyst. Therefore, a non-ceramic material is used for the constituting material of the pre-filter, and/or the pre-filter is provided to be able to exchange to periodically replace it or to replace it at the end of the service life in the preferable embodiment of the present invention. Making the pre-filter to be able to exchange permits the service life of the filter as well as the service life of the overall filter device to be prolonged.

While the present invention is described in more detail hereinafter with reference to examples, the present invention is by no means restricted to these examples.

Example 1

Disposition of the Anchor Substance Within the Ceramic Filter

A small honeycomb structure piece was cut from the central portion of cordierite DPF (which means the portion excluding the outer periphery and both side faces). The sample piece was immersed in a $H_3PO_4$ solution. After blowing off excessive $H_3PO_4$ solution with air, the sample piece was dried with a hot air stream, and fired at 700° C. in an electric furnace, thereby obtaining a honeycomb sample in which phosphorous (P) has been disposed within the partition walls of the small sample piece (referred to as a P-impregnated honeycomb sample). The content of P in the sample was 0.05 g/cc (honeycomb volume) as converted into $P_2O_5$.

Example 2

Coating of the Anchor Substance on the Surface of the Ceramic Filter

A commercially available $Al_2O_3$ powder (specific surface area: 200 $m^2$/g) was immersed in a $H_3PO_4$ solution and, after stirring with a pot mill for 2 hours, moisture in the powder was evaporated off to dryness. The residual powder was crushed in a dry state followed by firing at 700° C. for 3 hours. An $Al_2O_3$ sol and water were added again to the powder of $\gamma$-$Al_2O_3$ impregnated with the P component, and the mixture was ground again in a wet state in the pot mill to prepare a wash-coat slurry. Then, the slurry was wash-coated on a small honeycomb piece as the same sample piece as used in Example 1, and the sample piece was dried. The sample piece was fired thereafter at 700° C. for 1 hour in an electric furnace, thereby obtaining a honeycomb sample in which phosphorous P (referred to as an anchor substance) was disposed on the surface of the partition wall of the honeycomb small piece (referred to as a P-coat honeycomb sample). The P content in the sample obtained was adjusted to 0.05 g/cc (honeycomb volume) as in Example 1 by controlling the amount of the wash-coat.

(Durability Test)

The P-impregnated honeycomb sample obtained in Example 1 and P-coat honeycomb sample obtained in Example 2, as well as a honeycomb sample that is cut out from the central portion of the cordierite DPF and not impregnated with P, were prepared. These three kinds of the honeycomb samples were laid side face down, and ash components collected by the filter regeneration tests to be described hereinafter were adhered on the partition walls on the surface of the samples, followed by aging at 1300° C. for 10 hours in an electric furnace.

(Evaluation of Melting Preventive Effect)

After aging as described above, melting was observed on the partition wall in the honeycomb sample not impregnated with P as the anchor substance. Since cordierite has a melting point of 1450° C., it was confirmed that melting had been accelerated by the ash component adhered. In the P-impregnated honeycomb sample and P-coat honeycomb sample, on the other hand, most of the honeycomb structure and pore structure of the partition wall were maintained.

Example 3

Filter Device Having the Pre-Filter

A cordierite honeycomb having a diameter of 144 mm and length of 70 mm, a thickness of the partition wall of 152 $\mu$m and a cell density of 62 cells/cm$^2$ was impregnated with P by the same method as in Example 1 to obtain a pre-filter. A ceramic filter was also prepared by sealing a cordierite honeycomb, having a diameter of 144 mm and a length of 150 mm, a thickness of the partition wall of 305 $\mu$m and a cell density of 31 cells/cm$^2$, of which cells are sealed alternately on an inlet side face and an outlet side face to form a checkered pattern on both sides. The ceramic filter was combined with the pre-filter, and cased in a can having an appropriate shape to obtain a filter device comprising the pre-filter and ceramic filter.

Comparative Example

Filter Device Having No Pre-Filter

Only the same ceramic filter as used Example 3 was cased in a can having an appropriate shape to obtain a filter device comprising the ceramic filter without any pre-filters.

(Filter Regeneration Test)

Each filter device obtained in Example 3 and Comparative Example was attached to an exhaust pipe on a diesel engine placed on a table via an electric heater having a low gas flow resistance (the pre-filter was placed at the upstream side when the device has a pre-filter) for continuous operation of the diesel engine. The heater was actuated every time when 25 g each of the particulate had deposited in the filter device to remove the particulate by combustion. After repeating this process 10 times, the ceramic filter in each filter device was taken out, and the quantity of the ash component was weighed, obtaining 0.3 g and 1.6 g of the ash components from the ceramic filter combined with the pre-filter and from the ceramic filter used alone, respectively.

The test results showed that most of the particulate containing ash source had been removed by the pre-filter in the device having the pre-filter, consequently enabling the ash component accumulated in the ceramic filter. The ceramic filter with a reduced amount of the accumulated ash component has a small risk of melting, thereby enabling the ceramic filter to be used for a long period of time.

INDUSTRIAL APPLICABILITY

As hitherto described, the ceramic filter and filter device according to the present invention enables the ash component, which is not removed by the high temperature treatment such us combustion of the filter, and remains to be accumulated, to be suppressed from reacting with the filter component to cause of the filter, thereby allowing the filter to be used for a long period of time.

What is claimed is:

1. A ceramic filter to be used at an elevated temperature, comprising a ceramic filter having a principal component and a substance having preferential reactivity with an ash component contained in materials captured by the ceramic filter and not removed by a high temperature combustion treatment as compared to the reactivity of the ash component with the principal component of the ceramic filter, whereby the principal component is protected from melting.

2. A ceramic filter according to claim 1, wherein the ash component contains at least one substance selected from a group consisting of P, S, Ca, Na, Zn, Cr, Fe, Ni and Cu.

3. A ceramic filter according to claim 1, wherein the substance having preferential reactivity with an ash component over the principal component of the ceramic filter is at least one substance selected from a group consisting of B, Al, Si, P, S, Cl, Ti, V, Cr, Mn, Ga, Ge, As, Se, Br, Zr, Mo, Sn, Sb, I, Ce and La.

4. A ceramic filter according to claim 1, wherein the substance having preferential reactivity with an ash component over the principal component of the ceramic filter is allowed to stay within the ceramic filter.

5. A ceramic filter according to claim 1, wherein the substance having preferential reactivity with the ash component over the principal component of the ceramic filter is allowed to be present on the surface of the filter.

6. A ceramic filter according to claim 1, which has a honeycomb structure.

7. A ceramic filter according to claim 6, wherein cells of the ceramic filter having the honeycomb structure are sealed alternately on an inlet side face and an outlet side face to form a checkered pattern on both sides.

8. A ceramic filter according to claim 1, which is used as a diesel particulate filter.

9. A ceramic filter according to claim 1, wherein the principal component comprises cordierite and/or zirconyl phosphate.

10. A ceramic filter according to claim 1, which is equipped internally with a heater for removing most of the materials captured by the filter by a high temperature combustion treatment.

11. A ceramic filter device according to claim 1, which contains catalyst components for facilitating a heat treatment of the materials captured by the filter.

12. A filter device, comprising a ceramic filter according to claim 1, and a catalyst disposed upstream of the ceramic filter.

13. A filter device, comprising a ceramic filter having a principle component to be used at an elevated temperature, and a pre-filter disposed upstream of the ceramic filter and containing a substance having preferential reactivity with an ash component contained in the materials captured by the ceramic filter and not removed by a high temperature combustion treatment as compared to the reactivity of the ash component with the principal component of the ceramic filter.

14. A filter device according to claim 13, wherein said ash component contains at least one substance selected from a group consisting of P, S, Ca, Na, Zn, Cr, Fe, Ni and Cu.

15. A filter device according to claim 13, wherein the substance having preferential reactivity with the ash component as compared to the reactivity of the ash component with the principal component of the ceramic filter is at least one substance selected from a group consisting of B, Al, Si, P, S, Cl, Ti, V, Cr, Mn, Ga, Ge, As, Se, Br, Zr, Mo, Sn, Sb, I, W, Ce and La.

16. A filter device according to claim 13, wherein the substance having preferential reactivity with the ash component over the principal component of the ceramic filter is allowed to be present within the pre-filter.

17. A filter device according to claim 13, wherein the substance having preferential reactivity with the ash component over the principal component of the ceramic filter is allowed to be present on the surface of the pre-filter.

18. A filter device according to claim 13, wherein the ceramic filter has a honeycomb structure.

19. A filter device according to claim 18, wherein cells of the ceramic filter having the honeycomb structure are sealed alternately on an inlet side face and an outlet side face to form a checkered pattern on both sides.

20. A filter device according to claim 13, wherein the ceramic filter is a diesel particulate filter.

21. A filter device according to claim 13, wherein the principal component of the ceramic filter comprises cordierite and/or zirconyl phosphate.

22. A filter device according to claim 13, wherein the ceramic filter is internally equipped with a heater for removing most of the materials captured by the ceramic filter by a high temperature combustion treatment.

23. A filter device according to claim 13, wherein the ceramic filter contains catalyst components for facilitating high temperature treatment of the materials captured by the filter.

24. A filter device according to claim 13, wherein the pre-filter has a honeycomb structure.

25. A filter device according to claim 24, wherein cells of the ceramic filter having the honeycomb structure are sealed alternately on an inlet side face and an outlet side face to form a checkered pattern on both sides.

26. A filter device according to claim 13, wherein the pre-filter is a diesel particulate filter.

27. A filter device according to claim 13, wherein the principal component of the pre-filter comprises cordierite and/or zirconyl phosphate.

28. A filter device according to claim 13, wherein the pre-filter is internally equipped with a heater for removing most of the materials captured by the pre-filter by a high temperature combustion treatment.

29. A filter device according to claim 13, wherein the pre-filter contains catalyst components for facilitating high temperature treatment of the materials captured by the filter.

30. A filter device according to claim 13, wherein a catalyst is disposed upstream of the pre-filter.

31. A filter device according to claim 13, wherein the pre-filter is exchangeable.

* * * * *